(12) United States Patent
Cheng et al.

(10) Patent No.: US 6,392,371 B1
(45) Date of Patent: May 21, 2002

(54) UNIVERSAL FREQUENCY ELECTRICAL GENERATOR

(75) Inventors: Dah Yu Cheng; Alan L. Helgesson, both of Los Altos Hills, CA (US)

(73) Assignee: Cheng Power Systems, Inc., Mountain View, CA (US)

( * ) Notice: Subject to any disclaimer, the term of this patent is extended or adjusted under 35 U.S.C. 154(b) by 0 days.

(21) Appl. No.: 09/541,257

(22) Filed: Apr. 3, 2000

Related U.S. Application Data

(63) Continuation-in-part of application No. 09/158,464, filed on Sep. 22, 1998, now Pat. No. 6,047,104.

(51) Int. Cl.[7] .............................. H02P 9/30; H02P 9/48
(52) U.S. Cl. ............................. 318/158; 322/32; 322/72
(58) Field of Search .................................. 318/140, 147, 318/156, 158, 439; 322/26, 28, 29, 32, 44, 59, 72

(56) References Cited

U.S. PATENT DOCUMENTS

| | | | |
|---|---|---|---|
| 2,519,118 A | 8/1950 | Curtis et al. | |
| 2,739,278 A | 3/1956 | Blankenship | |
| 2,861,236 A | 11/1958 | Blankenship | |
| 3,131,341 A * | 4/1964 | Kniazeff | 318/138 |
| 3,754,174 A | 8/1973 | Shibata | |
| 3,789,281 A | 1/1974 | Shibata | |
| 3,894,605 A | 7/1975 | Salvadorini | |
| 4,130,172 A | 12/1978 | Moody | |
| 4,246,531 A * | 1/1981 | Jordan | 322/28 |
| 4,361,789 A * | 11/1982 | Faulhaber | 318/254 |
| 4,467,230 A | 8/1984 | Rovinsky | |
| 4,625,160 A * | 11/1986 | Hucker | 322/32 |
| 5,160,868 A | 11/1992 | Yang | |
| 5,424,625 A * | 6/1995 | Haner | 318/725 |
| 5,562,566 A | 10/1996 | Yang | |
| 5,798,632 A * | 8/1998 | Muljadi | 322/29 |
| 5,804,935 A | 9/1998 | Radev | |
| 6,047,104 A | 4/2000 | Cheng | |
| 6,049,187 A * | 4/2000 | Haner | 318/725 |
| 6,188,204 B1 * | 2/2001 | Vithayathil et al. | 322/29 |
| 6,222,331 B1 * | 4/2001 | Blum | 318/254 |

* cited by examiner

*Primary Examiner*—Bentsu Ro
(74) *Attorney, Agent, or Firm*—Cooper & Dunham LLP

(57) ABSTRACT

A power generator in which the rotor's mechanical rotation speed and the output frequency can be varied substantially independently of each other through electronic controls, to achieve results such as better match between speed and load regime of the primary mover and the generator's output.

36 Claims, 14 Drawing Sheets

Linear or Ideal Commutation

Commutating Bar Driver

UNIVERSAL FREQUENCY ELECTRICAL GENERATOR

RELATED APPLICATION

This application is a continuation-in-part of parent application Ser. No. 09/158,464 filed Sep. 22, 1998 and issued on Apr. 4, 2000 as U.S. Pat. No. 6,047,104, the entire contents of which are hereby incorporated by reference in this patent specification.

FIELD

This patent specification is in the field of electric machines such as power generators and pertains more specifically to an ability to vary one or both of the mechanical rotation speed of the prime mover and the output frequency of the generator substantially independently of each other, and also to eliminating the need for a torque gear box when using an arrangement in which the mechanical rotation speed and the output frequency are difficult to match, such as when a high RPM prime mover drives a lower output frequency generator.

BACKGROUND

Electric generators have been used for over a century, the principle dating back to Faraday and Fouquet and simply stated as follows: If a wire in a magnetic field is moved relative to the field by a mechanical force (greater than the electromagnetic force), a current in the wire or a voltage across the wire is generated and thus mechanical motion is converted to electric power. To satisfy the various requirements of energy generation standards, different forms of electric generator systems have been devised. All can be said to obey the electromotive principle of Faraday, as later more precisely described by Lenz.

The prevalent type of power generators are AC generators, although DC generators are used in certain applications. There are many configurations of AC generators, the most common being a generator in which the coils that supply the electrical power are stationary and the magnetic field that induces the current therein rotates. The main components of a typical synchronous AC generator are the stator and the rotor. The rotor typically has an even number of poles of alternating polarity. Each pole has a field coil, and the field coils are electrically connected to form a field winding. An exciter feeds DC current into the field winding, and the resulting mmf (magnetomotive force) creates the desired rotating magnetic field. The exciter can be a DC generator driven by the same prime mover (e.g., a hydroturbine, or a steam or gas turbine) as the rotor. The DC current is fed into the rotor field winding via brushes and slip-rings. In a "brushless" exciter, the DC current can be obtained from a separate AC winding placed on a separate rotor connected directly to the main rotor, through a rectifier circuit placed on the rotor and rectifying this AC current.

The stator or armature winding, in which the desired emf (electromotive force) is generated, is typically placed in regularly arranged slots on the stator's inside or outside surface. The stator winding comprises coils arranged such that the coil sides are one pole division apart. For example, for use with a four-pole rotor, they are 90° apart. As the prime mover rotates the rotor, the magnetic flux the field winding on the rotor generates sweeps the armature winding, inducing therein the desired emf. With a four-pole rotor, a full cycle of emf is obtained when the rotor turns through 180 mechanical degrees, which corresponds to 360 electrical degrees. In the more general case of a p-pole generator (where p is a positive integer), rotated mechanically at n RPM, the electrical frequency in Hz is related to the number of poles p and the mechanical rotation speed in RPM as $f=pn/120$. Conversely, $n=120$ f/p.

A single phase AC generator has a single armature winding on the stator, but this typically is used only for low power applications because of factors such as mechanical vibration and power pulsations. The most common arrangement for higher power is the three-phase system that produces three voltages, at three terminals that have equal rms values (relative to a fourth, neutral terminal) but phases that are 120° apart.

A synchronous generator typically feeds a power grid (often through a step-up transformer) but can be connected to the grid only when several conditions are satisfied: (a) the frequency of the grid and the generator emf are the same (e.g., for a 60 Hz grid, the generator's rotor turns at 3600 RPM for a 2-pole rotor, 1800 RPM for a 4-pole rotor, etc.); (b) the phase sequences of the generator and grid are the same; (c) the generator's emf is the same as the grid voltage; and (d) there is no phase difference between the generator's emf and the grid voltage. Only when all four conditions are satisfied can the generator be safely connected, or can stay connected, to the grid to feed power thereto.

Because an AC synchronized generator typically links its mechanical rotating speed to line frequency, so that a 2-pole 60 Hz generator would rotate at 3600 RPM and a 2-pole 50 Hz generator at 3000 RPM, it can be difficult to achieve efficient operation of the prime mover, or to change from one output frequency to another, or to operate the prime mover in a way that effectively and efficiently respond to load changes. For example, with the advent of prime mover improvements certain engines can produce very high horsepower if allowed to operate at very high RPM. This can be incompatible with the desired output electrical frequency, and can mean reducing the engine weight and improving its efficiency but having to add on a heavy, torque gear box, which would decrease the overall efficiency and increase maintenance and cost.

Typical known generators are discussed in O. I. Elgerd, et al., *Electric Power Engineering*, $2^{nd}$ Ed., Chapman & Hall, Int'l Thomson Publishing 1998, which is hereby incorporated by reference, and is referred to below by its title.

SUMMARY

A preferred embodiment described below overcomes these and other disadvantages of the known prior art by providing the ability to drive the generator at a convenient mechanical speed while producing another output frequency as desired. Stated differently, the magnetic field the rotor produces can rotate at a speed substantially independent of the rotor's mechanical rotational speed. As a result, the prime mover can rotate the rotor at a speed substantially different from the speed that otherwise would be dictated by the desired output electrical frequency—for example, a high speed turbine can drive the rotor shaft at its own speed and still feed a 60 Hz or a 50 Hz power grid. As another example, the same generator can be efficiently used to feed either a 60 Hz or a 50 Hz power grid, the difference being only in settings of the electronic controls that establish and maintain the rotational speed of the magnetic field the rotor produces, without a need to change the rotor's mechanical rotation speed. As yet another example, a generator that does not feed a power line of a fixed frequency can be efficiently operated at any one of a number of output frequencies without needing to change the prime mover RPM. Moreover, the load conditions can be accounted for by changing the prime mover's speed to match the current load while keeping the electrical frequency constant or changing in a different way. In this manner, the prime mover can be operated at speeds that are efficient for the current load, but the generator's output frequency can stay the same, or can change in a desired way.

As described in the parent patent, such advantages can be achieved by primarily mechanical or primarily electronic controls. In a mainly mechanical implementation, the differential speed required to drive the brushes supplying power to the field winding is determined after the drive speed and desired output frequency are selected. A mainly electronic implementation allows more design freedom, and computer-age electronics and principles enable auto-synchronization for preferable results. Eliminating the transient stabilization cage, used with current synchronized generators, is an important developmental step. Since the stabilization cage is designed for an induction motor rotor system, a slip frequency between the field winding and armature produces a strong back emf if the rotor is running at off-synchronization speed; this, in turn, produces a bucking torque against the non-synchronized motion.

One objective of the systems and methods disclosed herein is to provide an electronic commutating circuit that can synchronize with the power line starting at zero mechanical speed. Another objective is to stabilize a generator without an induction motor cage. A further objective is to easily convert a brushless synchronized generator into a brushless universal generator. Yet another objective is to improve the operation of generators while being able to continue to use most of the basic construction and arrangement of known generators, e.g., rotor and field winding, stator and armature winding, and commutator bars as they exist in known AC generators, such as single phase and three-phase generators. Additional objectives will become apparent from the detailed disclosure set forth below.

DETAILED DESCRIPTION OF PREFERRED EMBODIMENTS

Figure 1A:
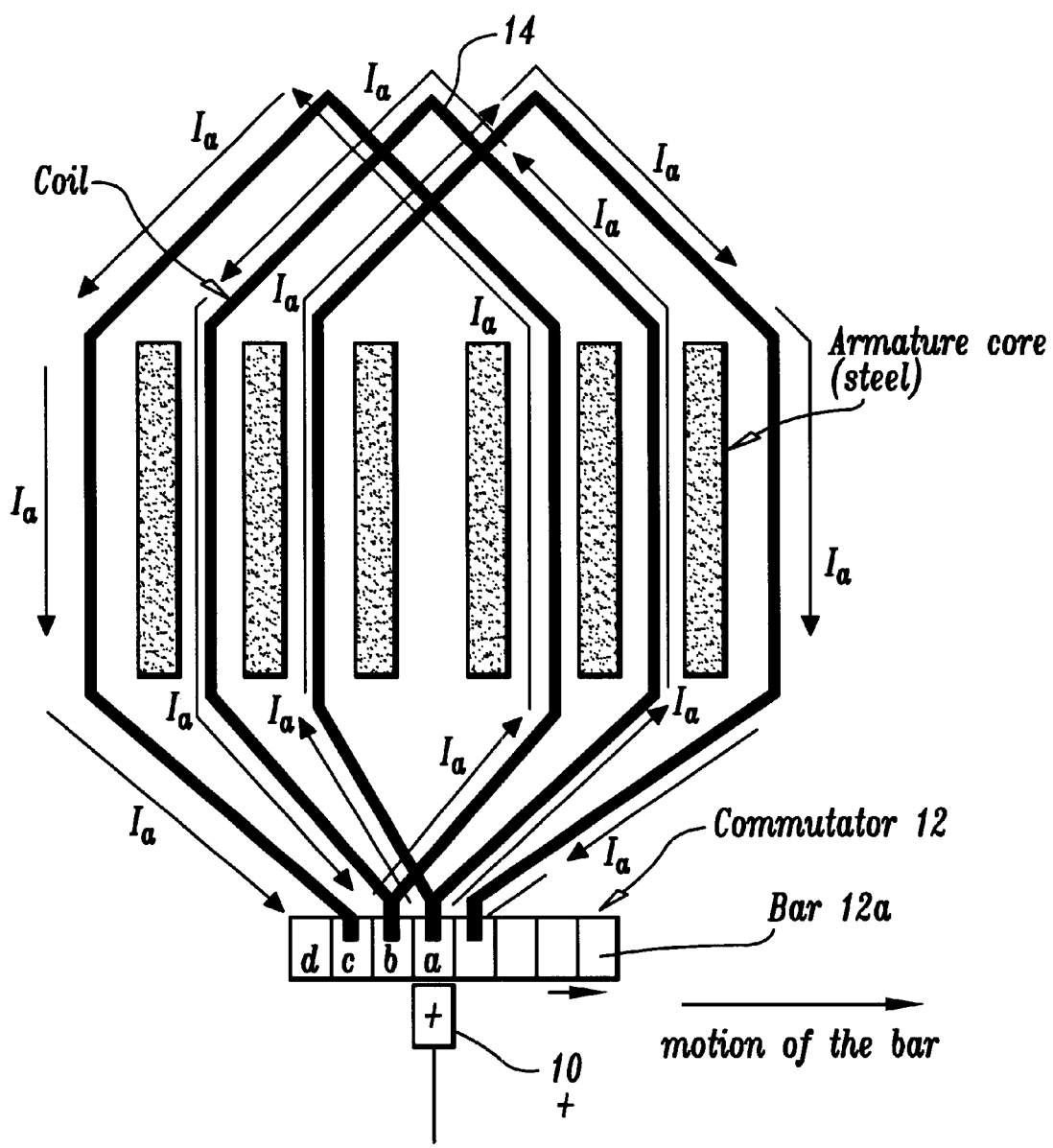
FIGS. 1a, 1b and 1c illustrate a typical mechanical carbon brush commutating system and the currents in armature coils produced as the brush moves from one commutator bar to the next.
Figure 1B:
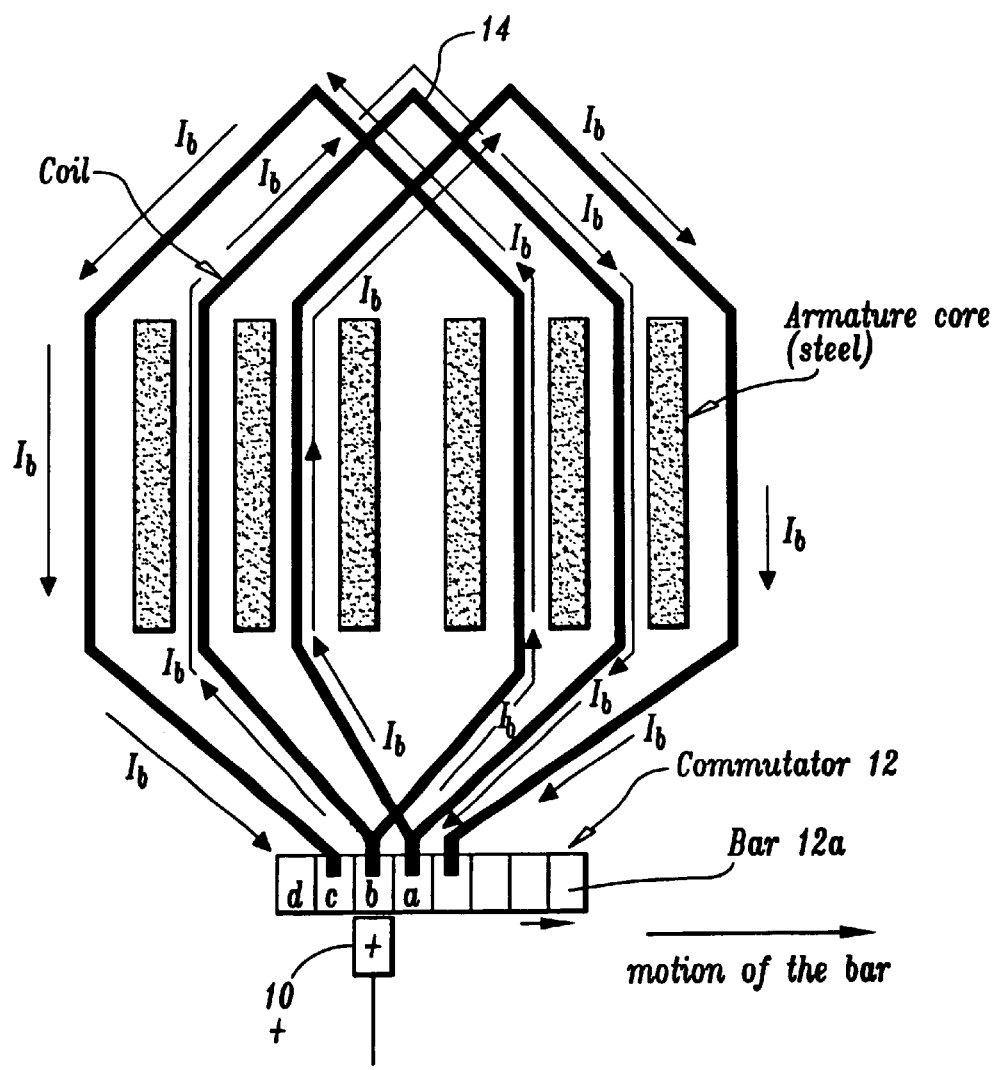
Figure 1C:
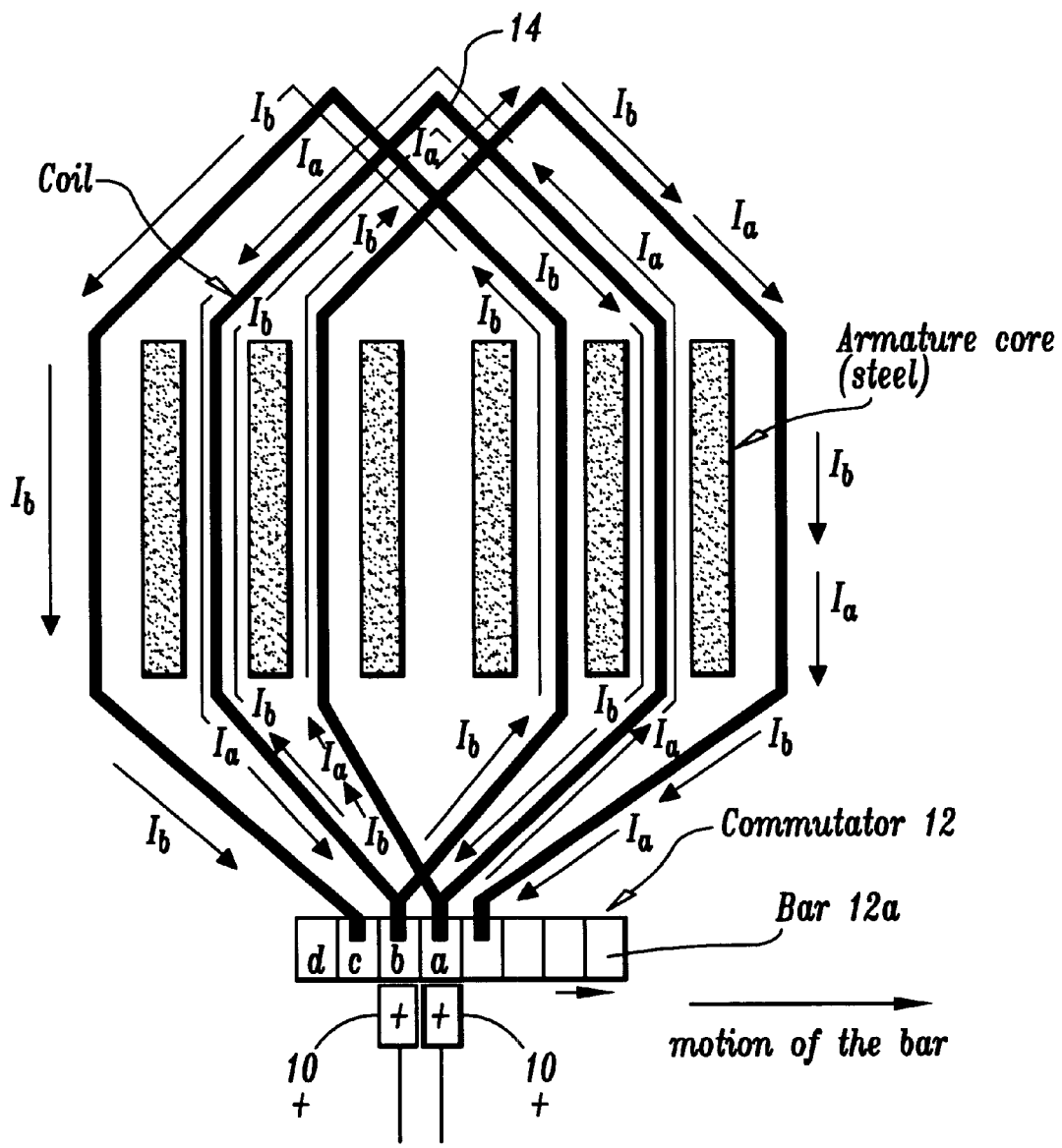

FIG. 1a illustrates a portion of a typical mechanical brush system that functions as a switch to convert the current flowing direction of one set of armature coils in a AC generator's stator from a positive to a negative direction in the course of relative rotation between a brush and the commutator bars. It also converts adjacent armature coils from negative to positive. As seen in FIG. 1a, a brush 10 at a positive voltage level makes electrical contact with a commutator bar segment a that is a part of a conventional commutator bar 12. As a result of this electrical contact, a current ($I_a$) moves around a coil 14 in the direction indicated in FIG. 1, and in the indicated directions in the other coils that are illustrated and are a part of the same armature winding. For simplicity, a single phase generator is illustrated, but the principles apply to 3-phase generators as well. As seen in FIG. 1b, when relative motion between the same brush 10 and commutator bars 12 has brought brush 10 in electrical contact with commutator bar segment b, and out of electrical contact with segment a, the direction of current ($I_b$) in the same armature coil 14 is opposite the direction that current ($I_a$) had, and the direction of the current in the other coils due to the contact of brush 10 with segment b is as illustrated in FIG. 1c. FIG. 1c illustrates the same brush 10 in two different positions relative to commutator bar 12 (assumed at different times during relative motion between the brush and the commutator bars) and the directions of the currents due to electrical contact with segment a and electrical contact with segment b.

Figure 2:
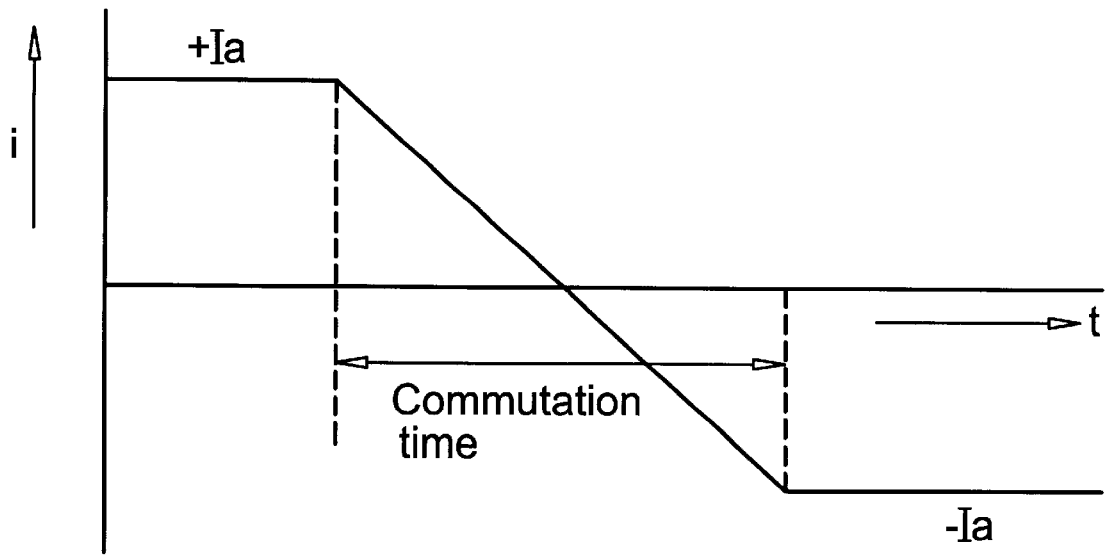
FIG. 2 illustrates a current switching profile of a commutating bar.

FIG. 2 illustrates the time history of a current (I) during the switching of one segment of commutating bar 12. The contact surface between brush 10 and commutator bar regulates the flow of the current through the brush's relatively high resistivity. A linear time current profile in the commutation time indicated in FIG. 2 is desirable for maintaining a constant current flow for the rest of the armature coils 14.

Figure 3:
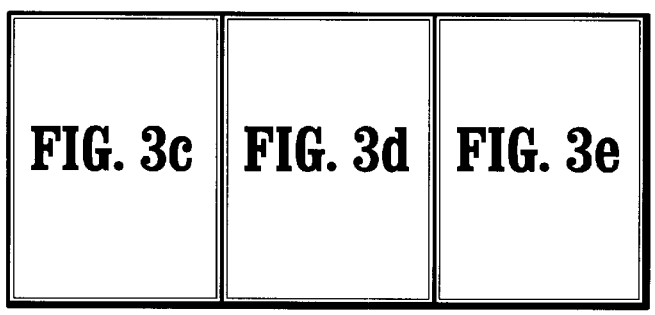
FIGS. 3, 3a and 3b are circuit schematics illustrating electronic circuits used in supplying power to commutator bars and thus to the field winding, without needing brushes or slip rings.

FIG. 3 is a detailed circuit schematic of an electronic switching circuit for a 32-segment commutator that can replace a bush arrangement of the type discussed in connection with FIGS. 1a–1c, and FIG. 3a is an enlargement of the driver for one commutator bar segment. Any suitable low-loss transistor system can be used; the circuit illustrated in FIG. 3 uses for each commutator bar segment a pair of N-type and P-type field effect transistors (F.E.T.). Using a typical commutating bar switching circuit, it is seen in FIG. 3 that the input signal from a functional master-switching computer determines the segment of the commutating bar to be used in the sequence. If a particular segment is selected, and depending on the current directions that need to be switched, either the N-channel or the P-channel F.E.T. receives a ramp signal at the biased gate input.

Figure 3A:
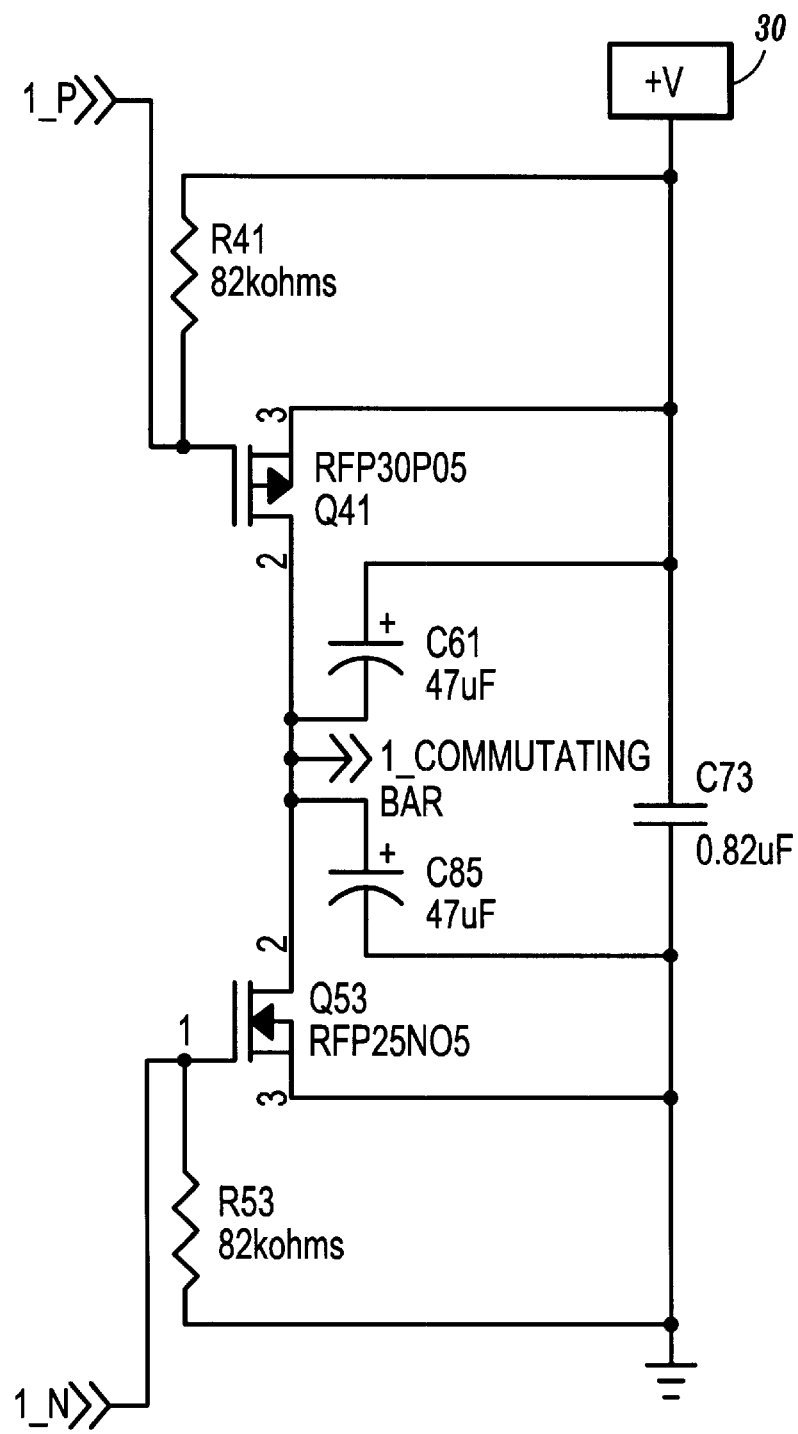

FIG. 3a illustrates one of the commutator segment drivers of the circuit shown in FIG. 3. In response to a control signal 1_P, a P-channel transistor Q41 turns on to connect a power supply 30 to an output terminal labeled "1_Commutating Bar," which is electrically connected to a respective commutator bar segment. Conversely, in response to a control signal 1_N, N-channel transistor Q53 turns on to connect the same output terminal "1_commutating Bar" to ground. Capacitors C61 and C85 are connected across the F.E.T. Q41 and Q53 to pick up the magnetic stored energy (C61 across the P-channel Q51 and C85 across the N-channel Q53). The F.E.T. capacitor C73 is a stabilizing capacitor that further absorbs transient voltages. Resistors R41 and R53 are part of bias and gate control circuits. Source 30 can be an exciter circuit of a known type for supplying DC currents to a field winding.

Figure 3B:
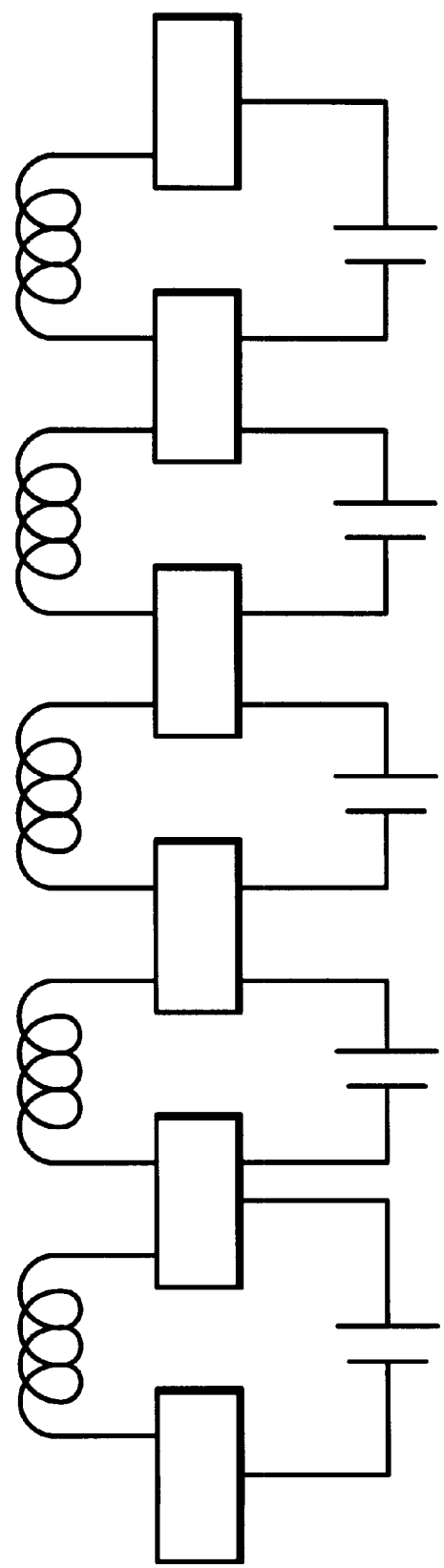
Figure 3C:
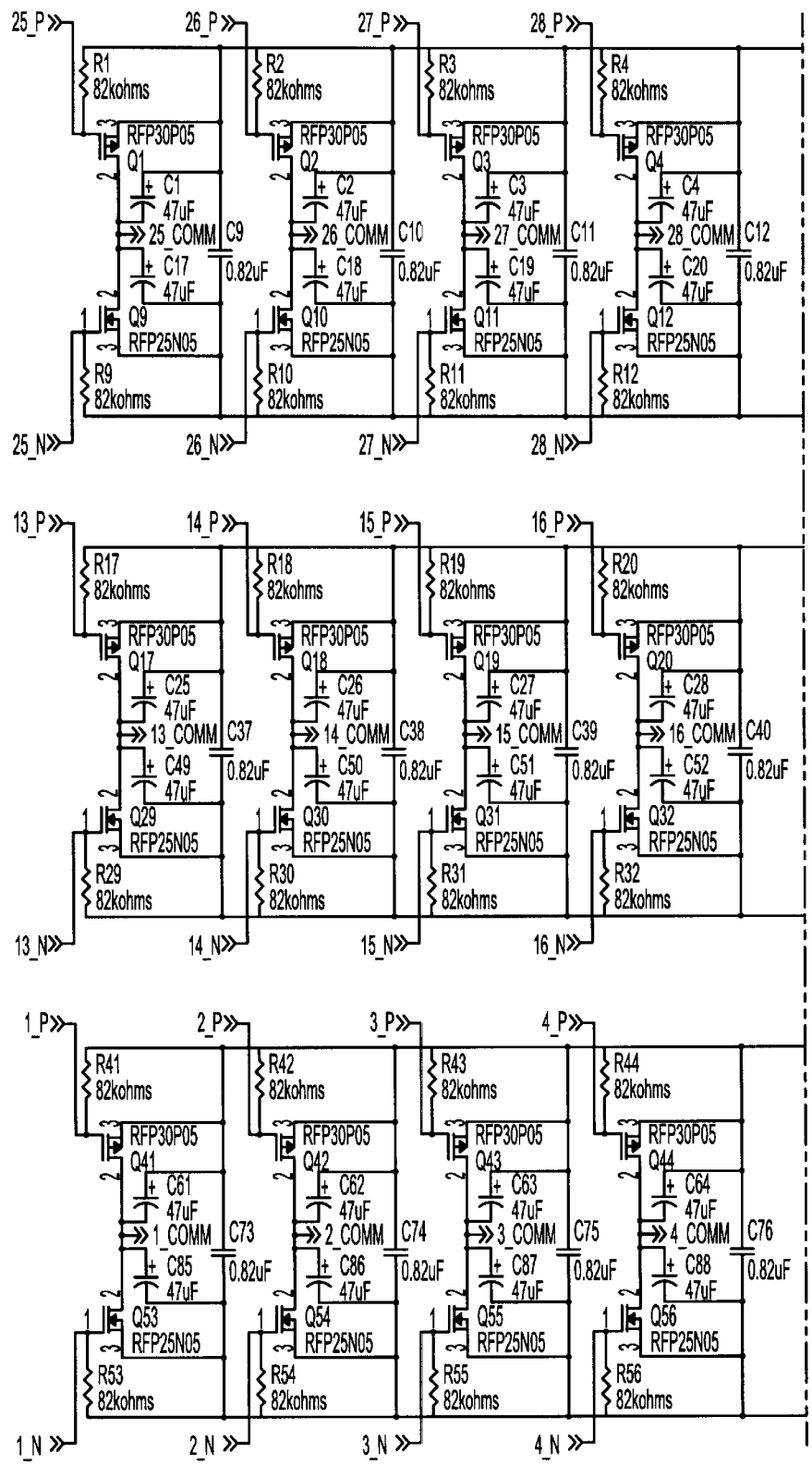
Figure 3D:
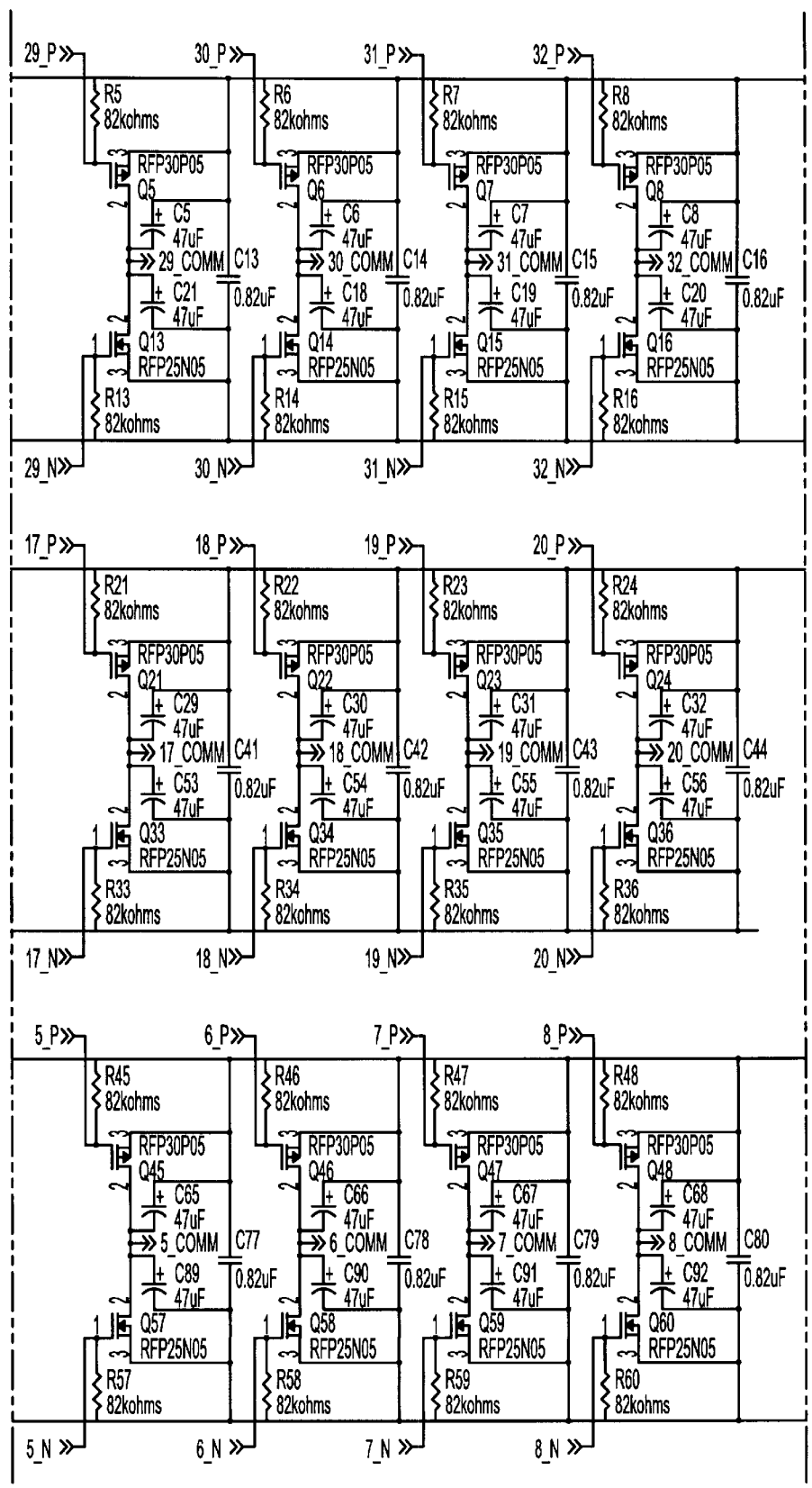
Figure 3E:
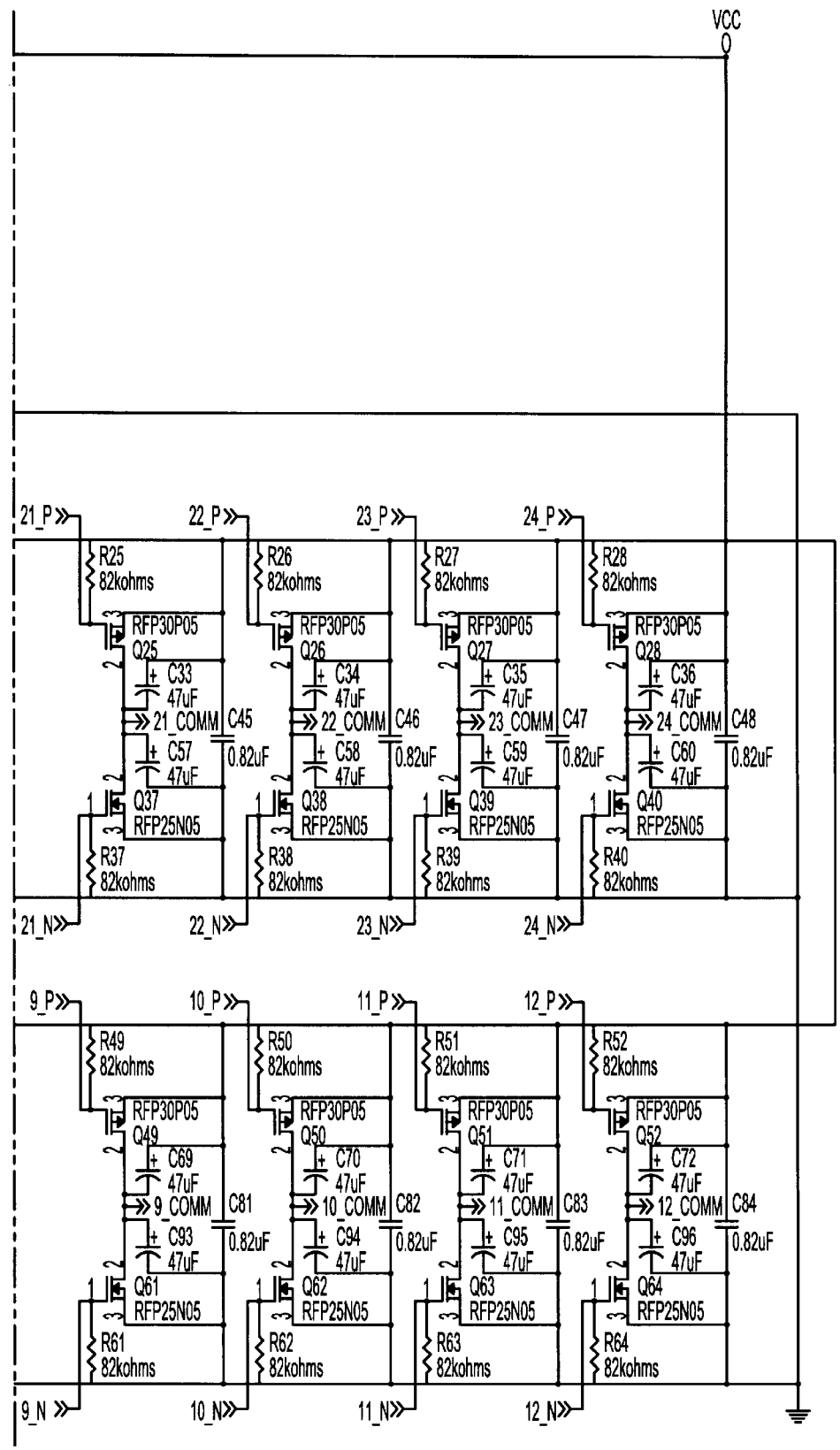

FIG. 3b is the equivalent circuit for a squirrel cage armature configuration, discussed in greater detail in connection with a brushless construction generator.

Figure 4:
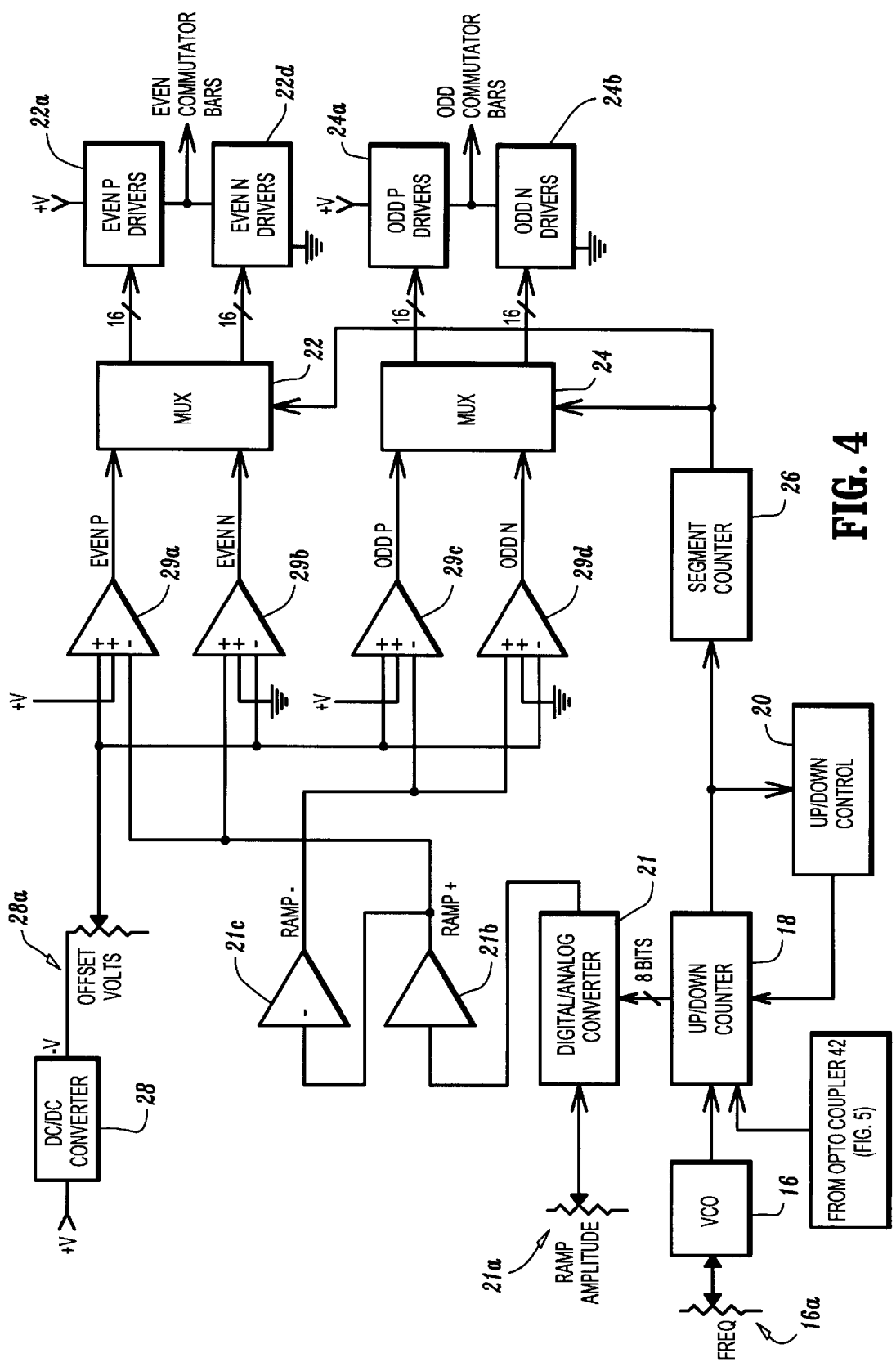
FIG. 4 is a block diagram illustrating a typical control circuit for supplying power to commutator bars for rotating the rotor magnetic field at a speed substantially independent of the rotors mechanical rotation speed.

FIG. 4 illustrates in block diagram form a complete digital commutation switching circuit. In FIG. 4, the terms "even commutating bars" and "odd commutating bars" represent alternate commutating bar segments. The even and odd-numbered segments are driven by different signals because, as one commutator bar segment (say an odd one) is being turned on by a ramped gate signal, the previous even commutator bar segment is being turned off by an oppositely phased ramp signal during the same commutator bar time slot. Additionally, pairs of P-channel and N-channel drivers that are 180° apart are turned on and off at the same time; however, because of the complementary nature of these transistors, the gates require oppositely-phased ramps that are referenced to the power supply voltage and ground, respectively.

In the example of FIG. 3, where there are 32 commutator bars, the N-channel F.E.T. Q53 on the firth commutator bar segment would be turned on at the same time as the P-channel F.E.T. 41 on the 21st segment. During this same time period, the N-channel on fourth segment and the P-channel on the $20^{th}$ segment would be turned off. If the number of commutator bar segments is not divisible by 4, then odd and even N and P-channel devices are not paired. For example, with a 22-segment commutator bar, the N-channel on the $5^{th}$ segment would be turned on at the same time as the P-channel on the 16th segment.

It should be clear that the term commutator bar segment is used because this is a typical element of a DC generator. While the same structure can be used in the embodiments disclosed here, the pertinent aspect is that a segment is connected electrically to a particular point at the armature winding. As no brushes or slip rings need be used in the disclosed embodiment, the commutating bar segments can be simply terminals to which driver outputs, such as output terminal "1-Commutating Bar," can be connected electrically through connections that can (but need not) be permanent.

The control circuit illustrated in FIG. 4 generates a frequency by means of a voltage-controlled oscillator (VCO) 16. If the power generator need not be synchronized to a grid, the output frequency of VCO 16 can be controlled manually, for example by a variable resistor arrangement 16a. The output of VCO 16 controls up/down counter 18, which counts up for one pulse from VCO 16 through 256 steps, and then its direction is reversed by a signal from up/down control 20, to count down 256 steps, this sequence being repeated. If it is desired to operate the power generator synchronized to a power grid (or to some other standard), the up/down counter 18 can be controlled by a signal from a component illustrated in FIG. 5 and discussed below, in which case VCO 16 need not be used and can be omitted from FIG. 4. The digital output of counter 18 (256 steps up or 256 steps down) is converted to an analog up-ramp or down-ramp signal at a D/A converter 21, with amplitude control over the analog ramps being provided by a variable resistor arrangement 21a that can be manually operated or can be controlled through a feedback loop that maintains a desired amplitude level for the ramps from converter 21. The analog ramps from converter 21 pass through complementary amplifiers 21b and 21c and emerge as a positive ramp (ramp+) and a negative ramp (ramp–) respectively. The two ramps are mirror images of each other, and 180° out of phase. The output of amplifier 21b is a sawtooth waveform and the output of amplifier 21c is another sawtooth waveform, with one having a positive peak where the other has a negative peak. These ramps are supplied to differential amplifiers 29a through 29d, which also receive an input from a power source such as a DC/DC converter 28 through a variable offset control 28a. A voltage source labeled V in FIG. 4 and serving as a $V_{cc}$ power supply powers the electronics. The function of the offset due to control 28 is described below in connection with FIG. 4a. The outputs of amplifiers 29a and 29b are supplied to a multiplexer 22 as signals labeled "even P" and "even N," respectively, and the outputs of amplifiers 29c and 29d are supplied to a similar multiplexer 24 as signals labeled "odd P" and "Even P." The multiplexers operate under the control of segment counter 26 to switch their outputs to successive commutator bar segments for each ramp.

Figure 4A:
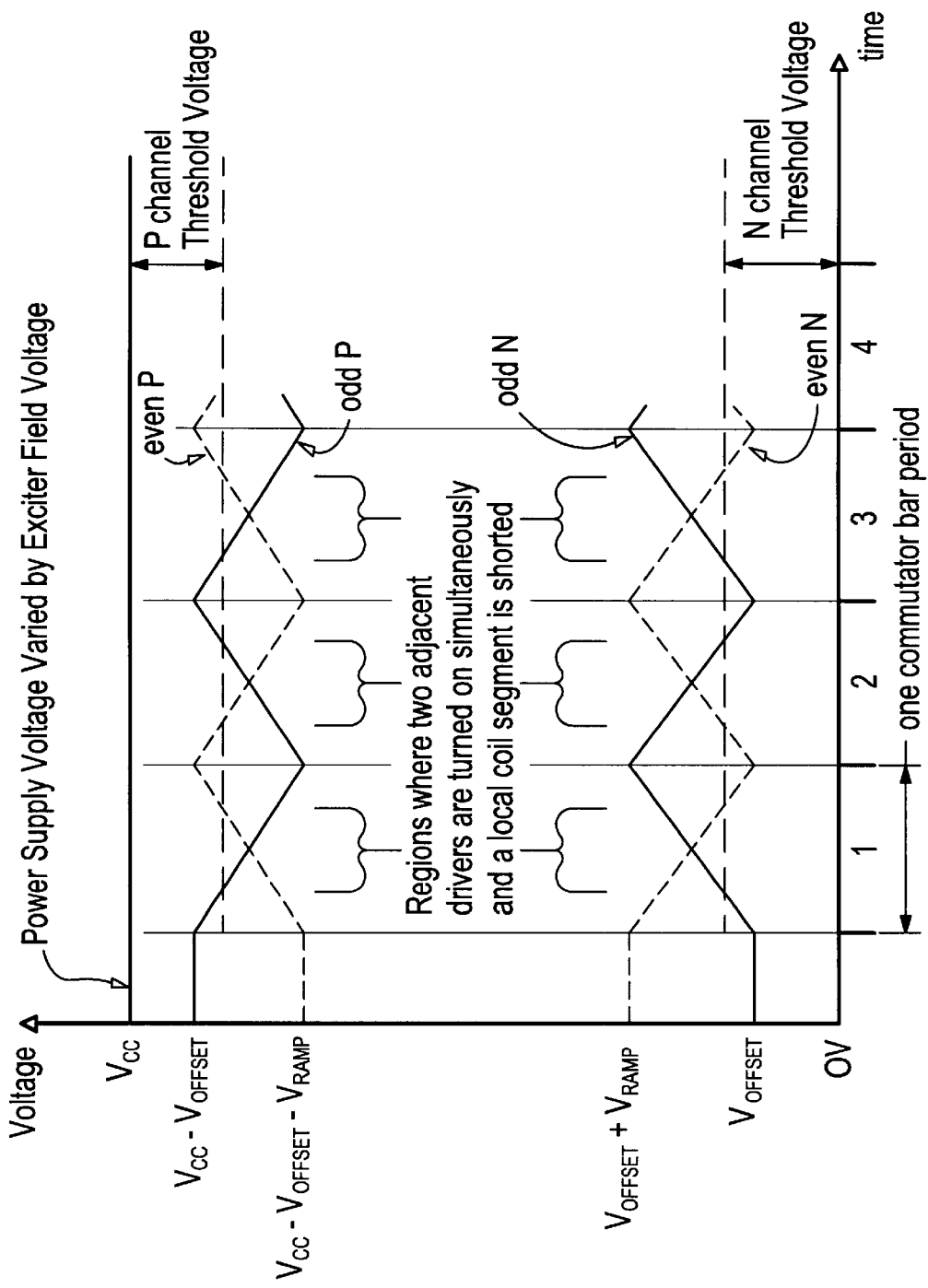
FIG. 4a is a timing diagram used in explaining ramp voltages controlling field winding currents.

Referring to FIG. 4a, the ramps from amplifiers 29a through 29d are illustrated, using the same notation as in FIG. 4 for "even P," "odd P," "even N," and "odd N." As seen in FIG. 4a, the respective ramp signals are 180° out-of-phase, and are offset, e.g. through an offset circuit such as 28a in FIG. 4, to account for the threshold voltages of transistors such as Q41 and Q53 in FIG. 3a. A label in FIG. 4a identifies the duration of one commutator bar (segment) period, which correspond to the duration of one up ramp or one down ramp. FIG. 4a also identifies time periods in which two drivers (such as the driver of FIG. 3a) for two adjacent commutator bar segments are turned on simultaneously and, therefore, a local coil is shorted.

Referring again to FIG. 4, each of multiplexers 22 and 24 has 32 outputs (in the case of using a 32-segment commutator bar), going into segment drivers 22a and 22b, and 24a and 24b, respectively. Multiplexer 22 feeds the drivers for the even-numbered commutator bar segments and multiplexer 24 feeds the drivers for the odd-numbered commutator bar segments. Drivers 22a and 22b are in fact 16 circuits that are the same as the driver of FIG. 3a. The outputs from multiplexer 22 going into the box labeled "even P drivers" in fact go to input terminals such as the terminal labeled "1__P" in FIG. 3a, and the outputs going into a box labeled "even N drivers" in FIG. 4 in fact go to input terminals such as the terminal labeled "1__N" in FIG. 3a. The output labeled "even commutator bars" in FIG. 4 in fact is the same as the output labeled "1__commutating bar" in FIG. 3a. Of course, in the case of a 32-segment generator, there are respective driver circuits, and respective input and output signals, for each of 16 even-numbered commutator bar segments. The structure and operation of multiplexer 24 and elements 24a and 24b are similar, taking into account the labels in FIGS. 3a and 4 and the fact that the odd-numbered 16 commutator bar segments are relevant.

Figure 5:
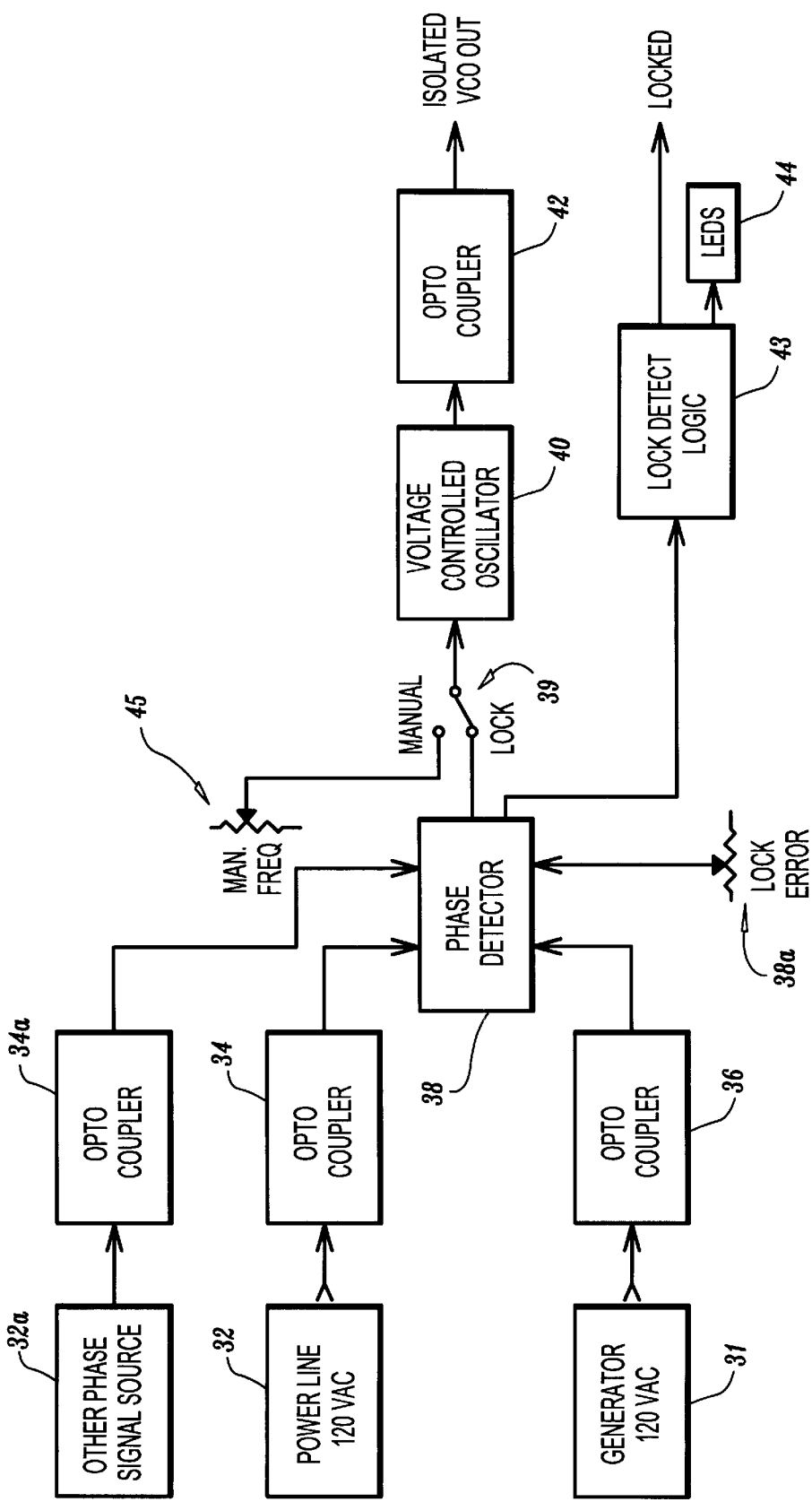
FIG. 5 illustrates a phase-lock circuit for synchronizing a generator with a power grid or some other reference in terms of frequency, phase, emf, and phase sequence.

FIG. 5 illustrates a phase-lock circuit for self-synchronization, a facility not available or entirely practical in purely mechanical systems. Thiscircuit allows a generator 31 to synchronize with the phase of the line voltage at power line 32 at any shaft speed of generator 31. For example, in FIG. 5 the phase of the line voltage can be sampled via an optical coupler 34. When the rotor in generator 31 is rotating and the generator outputs an open circuit voltage, an optical coupler 36 is used to detect the self-generated voltage for phase comparison with the line voltage signal at a phase detector 38. The output of a voltage-controlled oscillator 40, controlled by the phase detector 38 through an electronic switch 39, is fed into up/down counter 18 in FIG. 4, through an opto coupler 42, replacing the use of the output of VCO 16 in FIG. 4.

In operation, when switch 39 is in the shown position and phase detector 38 receives inputs from the output of generator 31 and power line 32 (but not from source 32a), phase detector 38 produces a signal related to any phase difference between its two inputs, as changed by a signal from a lock error source 38a that in effect allows a window of permissible phase error. The output of phase detector 38 controls the frequency of VCO 40, which has built-in limits of upper and lower allowable frequencies. By changing the frequency of VCO 40 in the appropriate direction depending on the signals from phase detector 38, the control circuit of FIG. 5 speeds up or slows down the rotation of the magnetic field of the rotor in generator 31 toward convergence, within the allowable error window, between the phases of the output of generator 31 and the power line grid 32. A circuit 43 detects when a phase lock is achieved, and LED indicators 44 light up to indicate this, so that a power switch (not shown) can be closed to connect the output of generator 31 to the power grid, provided the other conditions for that purpose are satisfied (emf, phase sequence, and frequency).

If desired, generator 31 can be phase-synchronized in a similar manner to another source 32a of a phase signal, in which case no phase input would be used from power line 32.

If no phase synchronization is needed or desired, switch 39 can be used to the position opposite that shown, to thereby disconnect phase detector 38 from VCO 40, and manually or otherwise control the output frequency of VCO 40 by a signal from an arrangement 45 that can include a variable resistor.

Start up can be otherwise similar to the procedures currently used for such generators, using an exciter and a feedback circuit to bring up the generator to the appropriate output frequency and emf and appropriate phase sequence (if a multi-phase generator is used). The additional torque in start-up may change the shaft speed, but the phase-lock circuit adjusts the speed to keep it synchronized. Drivers, which can be any mechanical or electrical prime movers, can detect the change in torque and R.P.M. requirements to provide proper mechanical energy.

Figure 6:
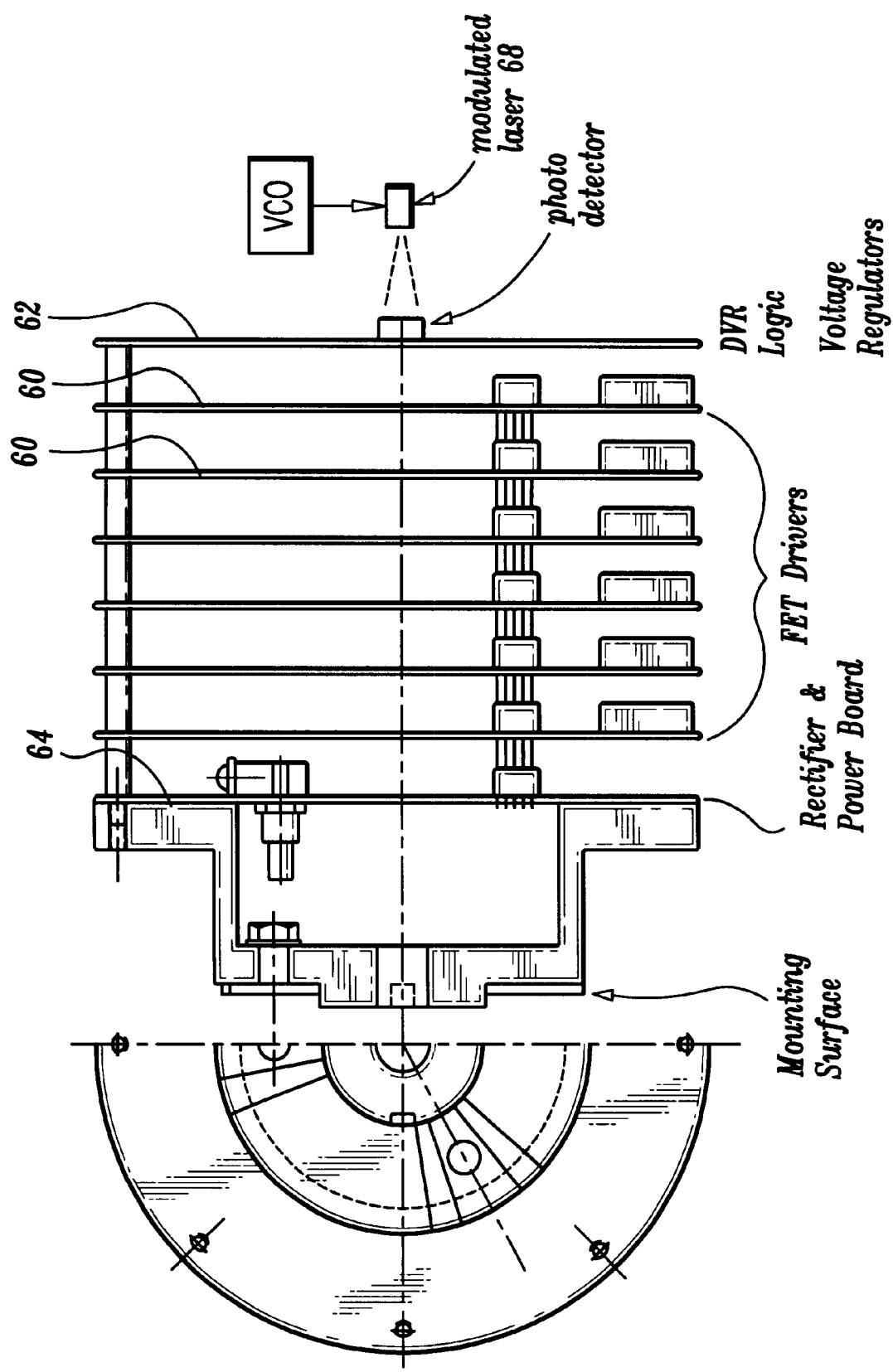
FIG. 6 illustrates a typical arrangement for electronically controlling the rotation of the rotor's magnetic field substantially independently of the mechanical rotational speed of the rotor.

FIG. 6 illustrates a typical mechanical arrangement that mounts on the generator 31 shaft so that the commutator control circuit described above will rotate with the shaft. Power for the circuit comes from either slip rings or a self-exciter system through a rectifier. The mechanical arrangement comprises a series of discs 60, which comprise typical electronic fiberglass circuit boards. These discs 60 carry the segment drivers, i.e., circuits such as illustrated in FIG. 3 for the respective segments. An additional disc 62 can carry logic circuitry for the drivers, such as a voltage regulator and driver logic and a photo detector 66. The discs rotate with the rotor shaft. VCO 40 discussed earlier need not be mounted with the rotating parts, and supplies the frequency information to the rotating parts through a modulated laser 68 whose output is detected by a photodetector, thus providing optical isolation. A VCO 16 can replace VCO 40 in FIG. 6 or power grid voltage serves as a reference frequency for the phase-locked circuit to feed into the system via optical signals. If a self-exciter (see FIG. 7) provides the power necessary to drive the field winding and power for the electronics, this can make the arrangement brushless.

Figure 7:
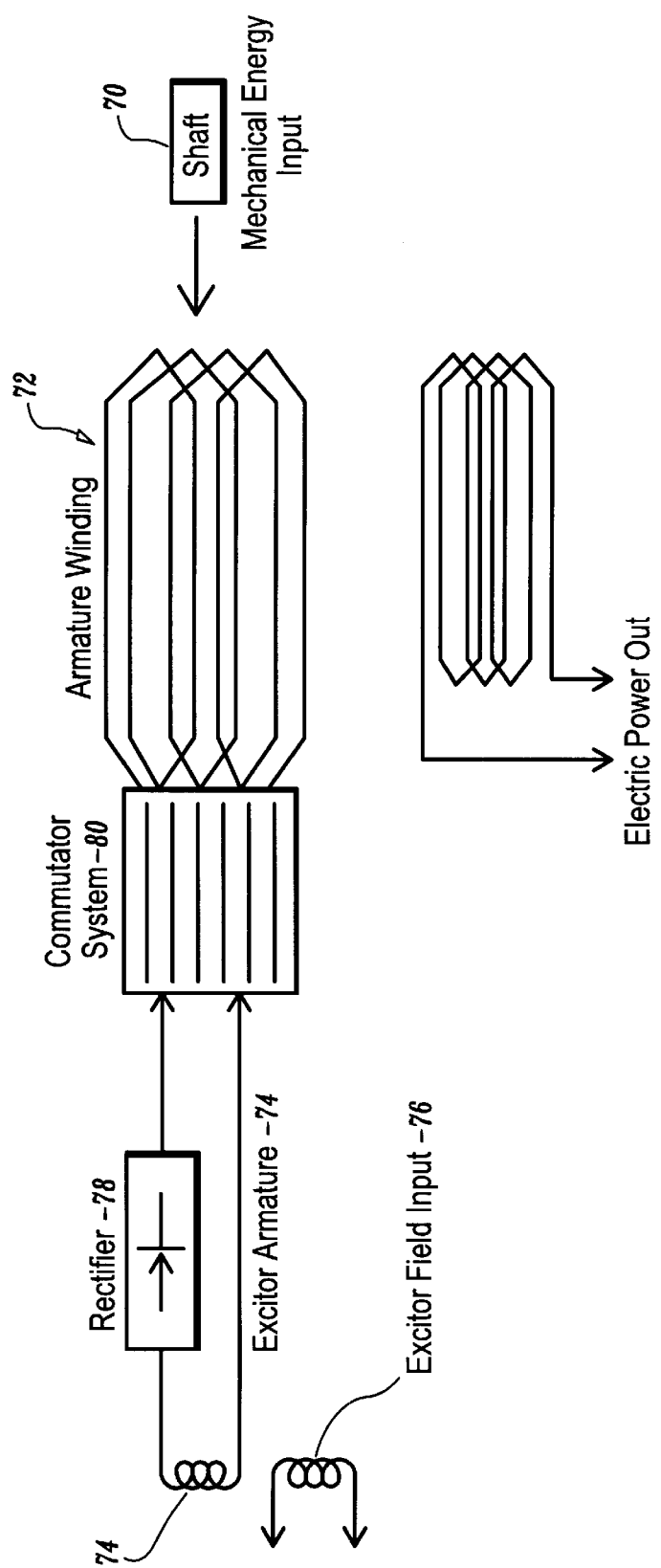
FIG. 7 illustrates a typical brushless variable speed synchronized generator.

FIG. 7 illustrates a typical brushless variable speed synchronized generator. The mechanical shaft 70 is attached to the main generator field winding (labeled "armature" in FIG. 7) and the exciter armature 74. The voltage supplied to the field winding 72 is controlled by the exciter coil 76, which receives its signal from an external control circuit. The generated AC power first feeds through a rectifier circuit 78, then into the electronic commutating system 80. The electronic commutating system 80 now controls the switching of individual coils on the field winding. This generates a rotor field, which interacts with a typical armature coil in the stator; the stator coil generates power. A typical brushless configuration according to this patent disclosure comprises the self-excitation power source of an ordinary synchronized generator and a DC brush-type commutating armature working in tandem. The system works as a mechanical electricity converter; using the field, the mechanical energy amplifies the electrical energy, raising it to a much higher generator output level. The mechanical energy also feeds into the exciter; this can be interpreted as a signal for amplification by the main armature system. Although normal feedback control can be used in this arrangement, the field of the exciter system usually uses a DC source. In the disclosure herein, either a DC or a rotating AC source is functional. The AC excitation can work with either a rotating or non-rotating field, but typically, if a rotating AC field is used, it is desirable for the field to rotate in the opposite direction of the mechanical shaft. This would amplify the required energy for the generator at a higher speed. As described before, and due to the back E.M.F., the feedback control of the generator can be different than that of ordinary synchronized generators. Since the feedback control involves the torque/ R.P.M. relationship, it will be individually programmed depending on the particular prime mover type being used.

Brushless Construction

Modern synchronized generators tend to be brushless. The field coil of the AC exciter is supplied by either an outside source or is linked to the output of the generator. An alternate power source for the excitor is a Variac. The exciter armature generates a variable frequency AC power, which is converted into DC power to feed the generator's rotor winding. Since the AC exciter is on the same shaft as the generator's rotor, it eliminates the need for the slip rings that brush type generators require, making the generator brushless. Although the same general type of a brushless arrangement can be used in this patent disclosure, the electronic signal from the outside control system can feed from optical couplers. Further, an AC exciter field can help generate power while the shaft is not rotating. Therefore, the rotating direction of the exciter field should be opposite that of the shaft so that higher voltage can be generated when the shaft eventually starts to move. This results in a higher power generation to feed the main armature windings and assures that the frequency will not decrease to zero at any shaft speed.

The configuration of a preferred variable frequency generator is a brushless configuration. The armature of the brushless synchronized generator is rewound so that the main armature field winding is configured as a DC armature without commutating bars, but with commutator connections. An electronic commutating system communicates the commutating speed difference between the line frequency and the actual shaft R.P.M. of the generator to provide a differential commutating speed. An AC exciter on the same shaft supplies the power for the generator's armature. It is converted into a DC power source, rendering the configuration brushless. The generator's field strength is controlled by the exciter field's strength, and the exciter field can be controlled by either a DC source or an AC source. If an AC source controls the exciter field, preferably this source would provide a rotating field for the excitor. The rotation should be in the opposite direction from that of the mechanical shaft. The input to the electronic commutator for the line frequency and the mechanical shaft R.P.M. should create a phase-locked R.P.M. linked by optical couplers. The actual mechanical configurations can be done so that the electronic commutation is located at the very end of the whole armature shaft, which comprises the exciter armature; the rectifier; the ball bearing; and the main field armature in the mechanical drive. The mechanical R.P.M. speed can be linked to the torque curve by a mechanical prime mover such as a gas turbine; a steam turbine; a hydraulic turbine; a wind turbine; or an internal combustion engine. This link can provide a particularly economical operation for a prime mover. For example, consider the efficiency of a single-shafted gas turbine rotating at 3600 R.P.M., regardless of load conditions. If the gas turbine is driving a traditional synchronized generator, its efficiency will drop off very rapidly under partial load conditions. Since the gas turbine must still run at 3600 R.P.M., it processes the same amount of air. The control method used decreases the working temperature which, in turn, lowers the thermal dynamic efficiency. However, if the gas turbine uses a variable speed generator of the type disclosed in this patent specification, it can operate more productively under partial load conditions at a speed below 3600 RPM. It will process less working fluid (air) and keep the operating temperature as high as possible with consideration for the engine specifications. Thus, the partial load efficiency of the gas turbine is increased through the use of the generator system disclosed here.

As another example, if a diesel engine is the prime mover for a generator, it is known that such an engine works best when its RPM can vary with torque load. However, since a typical prior art system is configured as a diesel generator set, the diesel engine must run at the synchronized speed regardless of its load conditions. This action does not match natural diesel engine operating characteristics. As a result, the diesel engine can only operate in a limited load range; otherwise, it must sacrifice a great deal of its thermal efficiency and require high fuel consumption. However, in an embodiment as disclosed here, the diesel engine RPM can vary with load changes.

An important design criterion here is the use of shunt capacitors across all the transistors as a means of suppressing transients as seen in FIGS. 3, 3a and 3b. The armature design has built-in stabilization characteristics for use under pulsating torque conditions, such as when the generator is driven by a piston engine, by means of capacitors linking the bars. The capacitors also serve the dual function of storing the inductive energy from the onset of the armature coil and switching the directions of its current. Unlike the carbon brush system, this system allows the inductive energy to resistively dissipate into heat. Provided that it operates as an isolated power supply without linking to a utility transmission line, the generator can also use an oscillator circuit as a reference instead of a line voltage frequency to operate at desired frequencies. As shown in FIG. 3b, the capacitors linking the commutating bars stabilize the pulsating torque; at high impulse conditions, this circuit behaves like a squirrel cage induction motor armature.

If the mechanical shaft stands still, the rotating R.P.M. of the electronic brush can approximate the generating frequency of the generator; when this happens, the variable frequency self-synchronization generator becomes an energy converter. It can then be used for purposes such as converting the DC energy source of a battery bank or fuel cell, or using the frequency feeding into the energy converter to generate a different desired frequency for power systems. This method of operation is possible because of the variable frequency synchronization generator design disclosed herein. For special applications, the exciter side of the generator winding can be designed appropriately to match the requirements of the generator energy needs. Regarding a DC to AC converter, an exciter is no longer required; only the DC source can be fed into the electronic commutator with the local oscillator as a reference for line voltage synchronization.

Ramifications

An electronic commutating system with an auto-synchronized phase-locked circuit provides a much easier way to operate a synchronized generator, since the mechanical gear box can be totally eliminated. The phase-locked circuit accelerates the synchronization action of the generator. This provides operational convenience and physically reduces the components required, thereby reducing manufacturing and maintenance costs. Since most generator systems can operate in the reverse manner of a motor system, the principles disclosed here apply to an electric motor design as well.

To drive a motor, today's variable speed drive circuits typically convert an AC source into a DC source, then convert an AC back into a variable frequency. This can make such a system expensive and inefficient. Controls as disclosed above can replace the old system of a variable speed drive, and the combination of a generator frequency converter and a variable speed drive can provide a major improvements in the use of electrical energy for industrial applications. Applications such as pumps, fans, variable speed drive paper machines, and textile operations can all benefit from using the control principles disclosed above, and the most important application of those principles can be electrical cars. Using the disclosure of this patent specification can make electrical cars less expensive, and lead to wider scale use of electric cars more rapidly. The variable speed drive disclosed herein when applied to electrical motor can change the power transmission systems for high speed railroads and electrical boat propulsion systems. Since the differential speed can be fed through fiber optic couplers, the system can be controlled using a single fiber optic wire linked to a computer control systems as a fly-by-wire control system for the future augmentation of control applications.

What is claimed is:

1. An alternating current generator comprising:
   a rotor having DC-wound rotor field coils connected to respective commutator terminals, said rotor being mounted for rotation at a mechanical speed;
   a stator electromagnetically coupled with said rotor and having at least one stator winding and an output for AC power;
   an electronic commutator circuit rotating with said rotor to deliver coil energizing power to said rotor coils to thereby create a rotor field rotating at a field speed; and
   a control circuit coupled to said electronic commutator circuit to control at least a timing of said energizing power to thereby cause a selected speed relationship between said mechanical speed and field speed for a selected frequency of said AC power.

2. An alternating current generator as in claim 1 including a variable load prime mover rotating said rotor, wherein said control circuit controls said timing to maintain said selected relationship between said mechanical and filed speeds despite changes in said variable load.

3. An alternating current generator as in claim 1 in which said output for AC power is coupled with a power grid and said control circuit includes a phase lock circuit coupled with said grid and said control circuit and providing an input to said control circuit to maintain synchronous operation of said generator.

4. An alternating current generator in claim 3 which the coupling between said input and said control circuit is free of a physical contact between a source of the input signal and the control circuit.

5. An alternating current generator as in claim 4 in which said coupling comprises a source of a modulated laser beam and a photo-receptor illuminated by the laser beam.

6. An alternating current generator as in claim 1 in which said control circuit includes an input for an external control signal connected to cause said control circuit to selectively vary said speed relationship.

7. An alternating current generator as in claim 1 in which said energizing power comprises voltage ramps applied to the respective field coils according to said timing.

8. An alternating current generator as in claim 1 in which said electronic commutator circuit comprises respective drivers couples with said commutator terminals to apply thereto voltage ramps in directions and for durations controlled in accordance with said timing.

9. An alternating current generator as in claim 8 in which said voltage ramps are offset from a base voltage by a selected voltage step.

10. An alternating current generator as in claim 1 in which said field coils are electrically connected in series, and said commutator terminals are electrically connected to the electrical junctions of two electrically adjacent ones of said field coils.

11. An alternating current generator as in claim 1 including an exciter providing an AC output and a rectifier converting said AC output to DC power supplied to said electronic commutator circuit for generation of said energizing power.

12. An alternating current generator as in claim 11 in which said exciter has an armature rotating with said rotor.

13. An alternating current generator comprising:
a rotor having field coils connected to respective commutator terminals, said rotor mounted for rotation at a mechanical rotation speed;
a stator electromagnetically coupled with said rotor and having at least one stator winding and an output for AC power;
an electronic commutating circuit comprising respective electronic switching circuits rotating with and coupled to said commutator terminals to deliver field coil energizing power thereto, said rotor in response generating a rotor field rotating at a field rotation speed; and
at least one control circuit coupled with said electronic switching circuits to control at least a frequency at which said electronic switching circuits deliver said energizing power to said field coils and cause a selected speed relationship between said field rotation speed and said mechanical rotation speed.

14. An alternating current generator as in claim 13 including a phase lock circuit coupled with output for AC power and said control circuit to maintain said selected relationship between the mechanical and field speeds.

15. An alternating current generator as in claim 14 in which the output for AC power is coupled to a power grid and said selected relationship corresponds to synchronous speed.

16. An alternating current generator as in claim 13 in which said electronic switching circuits comprise power transistor circuits connected to said commutator terminals to alternate between applying increasing and decreasing voltages to respective ones of said terminals.

17. An alternating current generator comprising:
a rotor having field coils with respective field coil terminals, said rotor being mounted for rotation at a mechanical speed;
a stator having at least one stator winding electromagnetically coupled with the field coils and an output for AC electrical power;
an exciter circuit generating alternating current and an AC-to-DC converter coupled to the exciter to convert alternating current therefrom into direct current;
a commutating field coil energizing circuit coupled with and powered by said direct current from the converter, and coupled with the field coils to deliver power thereto producing a rotor field rotating at a field rotation speed;
a control circuit coupled with said field coil energizing circuit to control a frequency of said energizing power to cause a selected speed relationship between said mechanical rotation speed and said field rotation speed.

18. An alternating current generator as in claim 17 including a phase lock input and a frequency control input to said control circuit and a switch selectively connecting one of said inputs to the control circuit to thereby control the phase and frequency of AC power at said output for AC power.

19. An alternating current generator comprising:
a stator having at least one stator winding and at least one output for electrical power at an output frequency;
a rotor having field coils and rotating relative to the stator at a mechanical rotation speed;
a field coil energizing circuit having electronic switching circuits coupled to respective ones of said field coils to deliver power thereto producing a rotor field rotating at a field rotational speed;
at control circuit coupled to the electronic switching circuits to control a frequency at which said switching circuits deliver said power to the respective field coils to thereby increase said field rotational speed when said output frequency is less than a desired frequency but decrease said field rotational speed when said output frequency is greater than said desired frequency.

20. An alternating current generator as in claim 19 in which said switching circuits are coupled to respective electrical junctions between electrically adjacent field coils.

21. An alternating current generator as in claim 20 including a phase lock circuit and a source of a frequency control input and a selection circuit selectively connecting one of said phase lock circuit and source to said control circuit for control over phase and frequency of AC power at said output for electrical power.

22. An alternating current generator as in claim 19 in which said generator further comprises an exciter and an AC-to-DC conversion circuit coupled thereto to provide DC power to said field coil energizing circuit.

23. A process of generating alternating current comprising:
rotating at a mechanical speed a rotor having DC-wound rotor field coils connected to respective commutator terminals, relative to a stator that is electromagnetically coupled with the rotor and has at least one stator winding and an output for AC power;
rotating with said rotor an electronic commutator circuit to deliver therethrough coil energizing power to said rotor coils to thereby create a rotor field rotating at a field speed; and controlling said electronic commutator circuit to control at least a timing of said energizing power to thereby cause a selected speed relationship between said mechanical speed and field speed for a selected frequency of said AC power.

24. A process as in claim 23 including phase-locking said coil energizing power to a power grid.

25. A process as in claim 23 including powering said electronic commutator circuit with DC power provided through a rectifier by an exciter rotating with said rotor.

26. A process as in claim 23 in which said speed relationship is not limited to an integer ratio between said speeds.

27. A process of generating alternating current in a generator comprising:

rotating at a mechanical speed a rotor having field coils connected to respective commutator terminals, relative to a stator electromagnetically coupled with said rotor and having at least one stator winding and an output for AC power;

electrically coupling with said rotor an electronic commutating circuit comprising respective electronic switching circuits rotating with and coupled to said commutator terminals to deliver field coil energizing power thereto, said rotor in response generating a rotor field rotating at a field rotation speed; and coupling at least one control circuit with said electronic switching circuits to control at least a frequency at which said electronic switching circuits deliver said energizing power to said field coils to cause a selected speed relationship between said field rotation speed and said mechanical rotation speed.

28. A process as in claim 27 in which said speed relationship is controlled to stable operation of the generator when the mechanical speed exceeds a synchronous speed.

29. A process of generating alternating current in a generator comprising:

mounting for rotation at a mechanical speed a rotor having field coils with respective field coil terminals, said rotation being relative to a stator having at least one stator winding electromagnetically coupled with the field coils and an output for AC electrical power;

generating alternating current with an exciter comprising a part of the generator and converting said alternating current from the exciter into direct current;

using said direct current to power a commutating field coil energizing circuit coupled with the field coils to deliver energizing power thereto producing a rotor field rotating at a field rotation speed; and controlling at least a frequency of said energizing power to cause a selected speed relationship between said mechanical rotation speed and said field rotation speed.

30. A process as in claim 29 including selectively causing the ratio of mechanical and field speeds to differ from an integer in stable operation of the generator.

31. A process as in claim 29 including operating the generator in a stable regime at a mechanical speed exceeding a synchronous speed of the field.

32. A process of generating alternating current in a generator comprising:

providing a stator having at least one stator winding and at least one output for electrical power at an output frequency, and a rotor having field coils and rotating relative to the stator at a mechanical rotation speed;

selectively delivering power to said field coils with a field coil energizing circuit having electronic switching circuits coupled to respective ones of said field coils to produce a rotor field rotating at a field rotational speed; and controlling the electronic switching circuits to control a frequency at which said switching circuits deliver said power to the respective field coils to thereby increase said field rotational speed when said output frequency is less than a desired frequency but decrease said field rotational speed when said output frequency is greater than said desired frequency.

33. A process as in claim 32 including controlling the electronic switching circuits with a phase lock circuit.

34. A process as in claim 32 including controlling the electronic switching circuits with voltage ramps that alternate between ascending and descending ramps delivered to respective junctions between said field coils.

35. A process as in claim 32 including controlling the electronic switching circuits for synchronous operation of said generator relative to a power grid.

36. A process as in claim 32 including controlling said electronic switching circuits to maintain a selected frequency and phase of AC power from the generator while varying said mechanical rotation speed.

* * * * *